Feb. 13, 1968  H. P. FURTH  3,369,140
ANNULAR CONFINEMENT OF HIGH TEMPERATURE PLASMAS
Filed Oct. 1, 1963  3 Sheets-Sheet 1
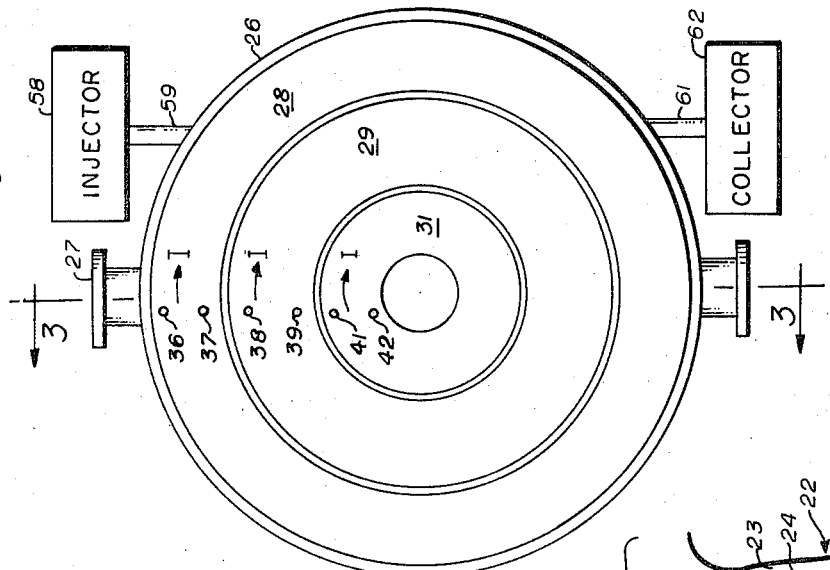
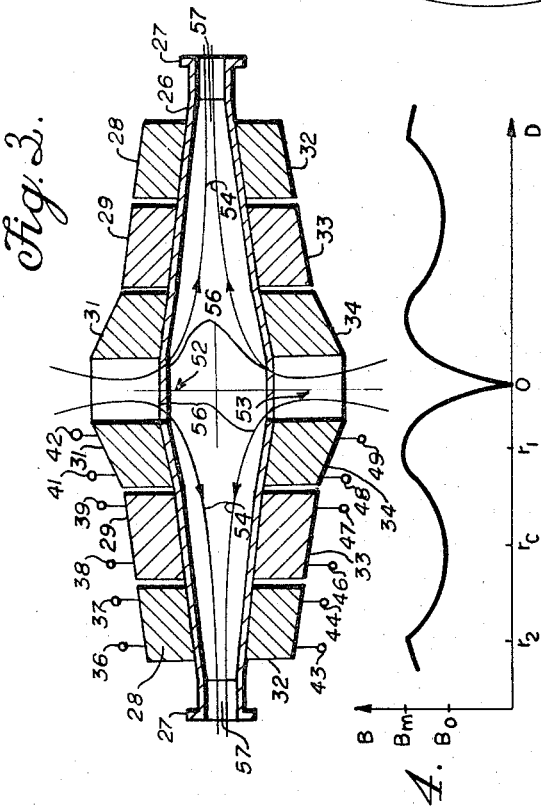
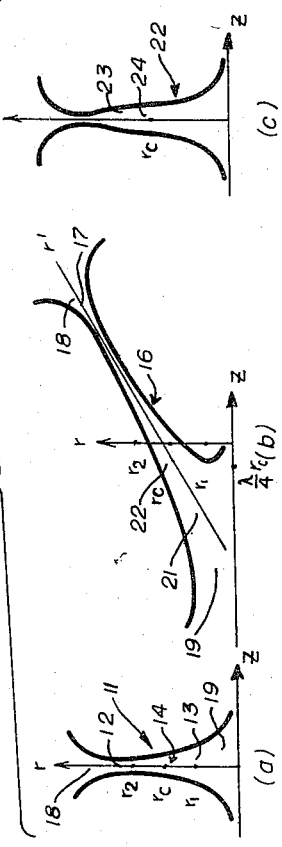
INVENTOR.
HAROLD P. FURTH
BY
*Roland A. Anderson*
ATTORNEY Feb. 13, 1968     H. P. FURTH     3,369,140
ANNULAR CONFINEMENT OF HIGH TEMPERATURE PLASMAS
Filed Oct. 1, 1963     3 Sheets-Sheet 2
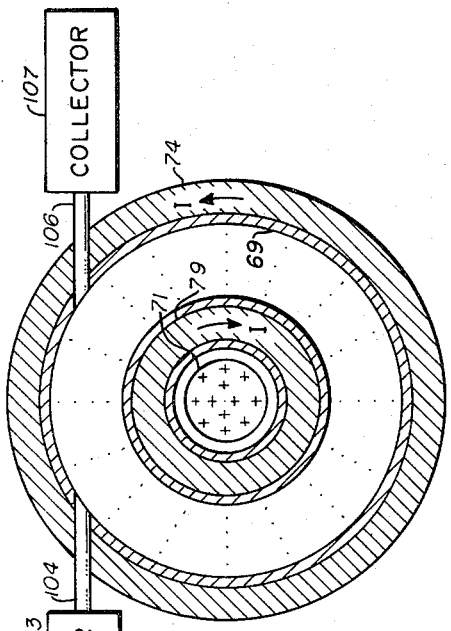
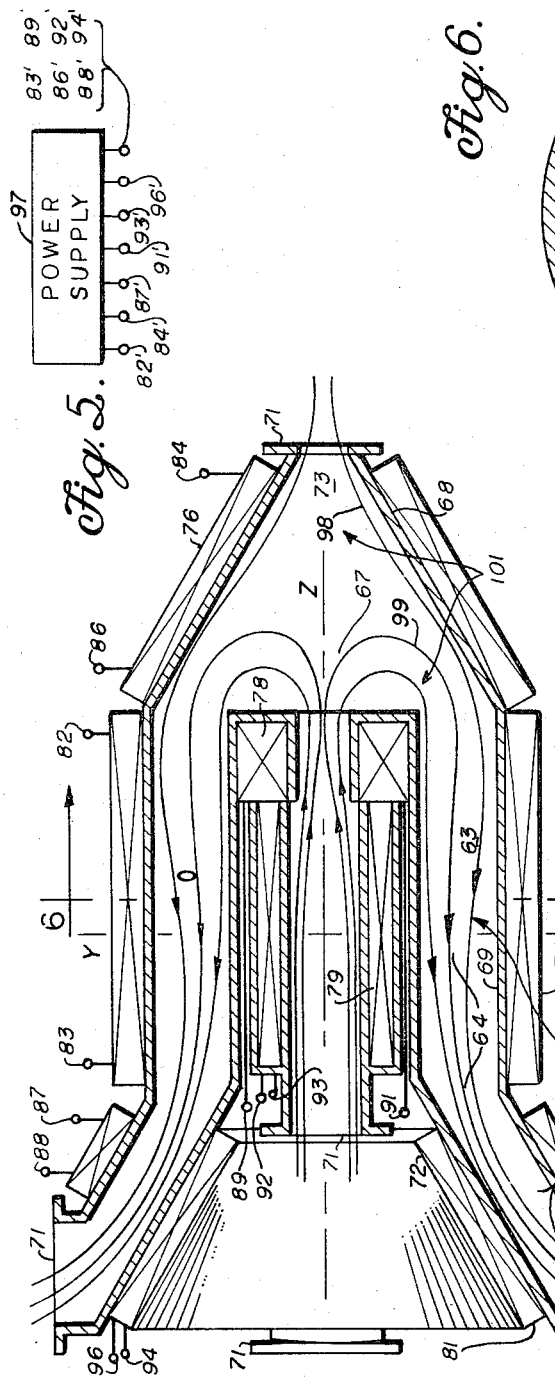
INVENTOR.
HAROLD P. FURTH
BY
ATTORNEY

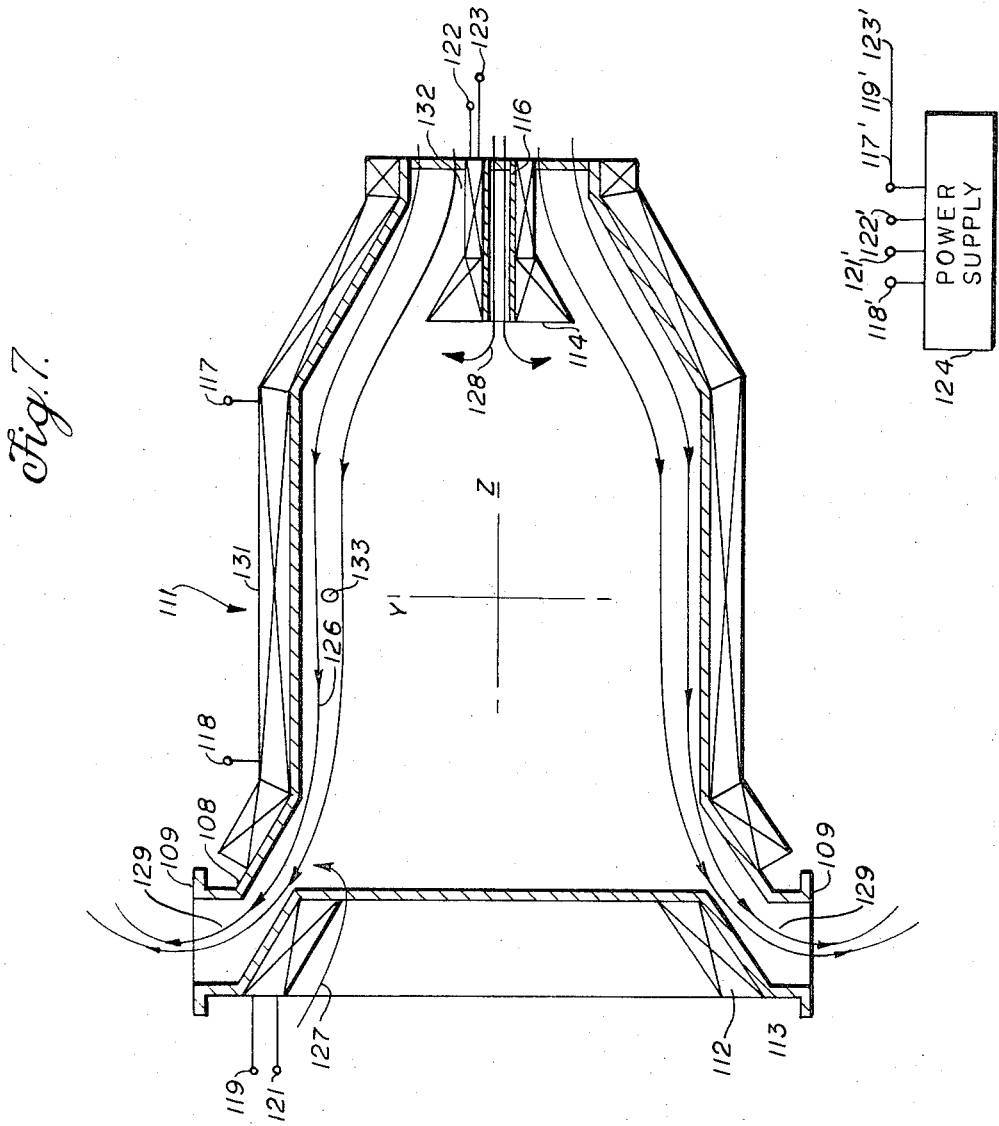

United States Patent Office 3,369,140
Patented Feb. 13, 1968

3,369,140
ANNULAR CONFINEMENT OF HIGH TEMPERATURE PLASMAS
Harold P. Furth, Berkeley, Calif., assignor to the United States of America as represented by the United States Atomic Energy Commission
Filed Oct. 1, 1963, Ser. No. 313,134
4 Claims. (Cl. 313—153)

ABSTRACT OF THE DISCLOSURE

Plasma containment device wherein an annular containment zone of relatively low magnetic field intensity is defined between annular relatively high magnetic field intensity magnetic mirror regions. At one limit is an embodiment in which the annular magnetic mirrors, with an intervening containment zone, are in concentric relation between planar solenoids and others in which the annular terminal magnetic mirror and intervening containment zone are provided generally in the annular space between at least partially overlapping concentric solenoids.

---

This invention was made in the course of, or under, Contract W–7405–ENG–48 with the U.S. Atomic Energy Commission.

The present invention relates in general to magnetic mirror confinement of a high temperature plasma. More particularly, it relates to the confinement of a high temperature plasma in an annular region established between annular magnetic mirror fields.

It has long been known that a self-sustaining controlled thermonuclear fusion reaction in which there is a net gain of energy is theoretically possible and consequently, is a potential source of useful power. In order to obtain power from nuclear fusion, a low pressure plasma comprised of light elements, for example, isotopes of hydrogen, needs to be heated to exceedingly high temperatures, e.g., $10^{9°}$ Kelvin, and confined by magnetic forces for a sufficiently long time that an appreciable fraction of the nuclei may fuse together. However, in attempting to confine plasmas with magnetic fields under conditions appropriate for the establishment of such a thermonuclear reaction, the art has been confronted with a major problem: the inability to contain the resultant plasma for a sufficient time to produce net energy from the fusion reactions.

In plasma confinement configurations wherein the absolute magnetic field strength decreases away from plasma, e.g., wherein the magnetic field lines bend concavely toward the plasma, it has been found that a localized penetration of the confinement field tends to be favored. This circumstance arises in that the localized magnetic field intensity enclosing the bulge in the field decreases progressively as the bulge increases in size and the area of the bulge accordingly provides a progressively weakened confinement area and the plasma may then penetrate and eventually escape through such area. The situation is aggravated when instabilities, e.g., hydromagnetic interchange instabilities exist, by increasing the probability of an initial penetration of the field. Penetration of the field, of course, results in the rapid escape of the energetic plasma particles through the "magnetic wall," i.e., the magnetic field, to the material wall of the container. As the energetic plasma particles collide with the material wall, there occurs a transfer of energy from the particles to the wall and the temperature of the plasma is lowered even to the point of destruction of the plasma.

Theory predicts that a plasma is stably confined in a magnetic field where the absolute magnetic field strength increases in a direction away from the midpoint of the plasma. As a result, considerable thought has been given heretofore to magnetic confinement configurations wherein the magnetic field lines bend everywhere convexly away from the plasma. One of the approaches is the so-called "cusp geometry" shown and described in Project Sherwood, A. Bishop, chapter 14, published by Addison-Wesley Publishing Company, Inc., Reading, Mass., 1958, where two magnetic field coils carrying current in opposite directions establish a pattern of magnetic field lines which is cusped. Although the "cusp" type magnetic field confinement system is stable against hydromagnetic interchange instabilities, the existence of a magnetic field zero point in the plasma region results in the impairment of the single-particle confinement. A plasma particle passing in the vicinity of the zero field point will experience for a gyromagnetic period a large change in the magnetic field over a very short distance (less than a distance comparable to one gyromagnetic radius). Hence, the magnetic moment is no longer an adiabatic invariant of the system. Consequently a plasma particle passing through the zero field point will have a subsequent motion which bears little or no relationship to that motion prior to its passage through the zero field point. This results in the particles being scattered at an excessive rate into the loss cone of the confinement field and hence a decrease in the confinement time of the plasma particles (Controlled Thermonuclear Reactions, Glasstone, Samuel, and Ralph H. Lovberg, published by D. Van Nostrand Company, Inc., Princeton, N.J., 1960, pp. 422–423, Sec. 11.24–11.25). Considerable advantage is therefore to be gained by the provision of a plasma confinement system that is stable against hydromagnetic interchange instabilities while simultaneously providing conditions for more effective particle confinement.

Now, it has been found that there can be produced a wide class of magnetic confinement field systems, wherein a plasma is confined in an annular volume disposed between spaced annular magnetic mirrors, so as to satisfy both the hydromagnetic interchange stability and single-particle confinement criteria.

The flux lines extending between the annular mirrors define an annular magnetic field region having a non-zero minimum energy density (magnetic pressure) locus and whose net flux line curvature about the locus is convex away from the central flux surface. Particles for forming the plasma injected and trapped in such an annular magnetic field configuration will be confined under conditions that satisfy both the hydro-magnetic interchange stability and single-particle confinement criteria.

Such annular magnetic field configurations may be established by various spacial arrangements of solenoidal coils. For example, similar annular coils carrying predetermined currents in opposite directions respectively and positioned so that their axes are coextensive generate such an annular magnetic field configuration. More particularly, a first annular magnetic mirror is provided in the region between said coils at a relatively small radial distance from said coextensive axes by convergence and consequent increase in intensity of the magnetic field lines which pass through the central opening of the annular coils. A second annular magnetic mirror is provided at a larger radial distance by convergence proximate the periphery of said coils in the annular space betwen said first and second annular mirror fields; a region of lower magnetic field intensity, but not of zero intensity, provides the annular plasma containment zone. Another arrangement of coils establishing such a magnetic field configuration comprises generally truncated conical annular coils carrying predetermined current in opposite directions positioned such that they are at least partially coaxial. Still another arrangement of coils establishing such a magnetic field configuration comprises a first generally truncated conical annular coil. A second truncated conical annular coil carrying a predetermined current in a direction opposite to the first coil is similarly oriented and disposed partially coaxial with and at the skirt end of the first coil. A third annular coil carrying current in a direction identical to the first coil is disposed partially coaxial with and at the truncated end of the first coil. In the latter coaxial arrangements, first and second annular magnetic mirror regions are provided by convergence and consequent intensification of the magnetic fields in the generally truncated conical annular space proximate the opposing inner and outer diameter marginal edges, respectively, of said coaxially aligned coils. A lower intensity truncated conical, i.e., a frusto-conical annular containment region is defined between said first and second mirrors along the annular space between said coaxial coils.

As will become apparent by consideration of the material to be set forth hereinafter, numerous modifications and variations of the particular spacial arrangement of the coils are possible for establishing a magnetic field configuration in accordance with the present invention.

Accordingly, it is an object of the present invention to provide a system for stably confining a high temperature plasma.

More particularly, it is an object of the invention to provide a magnetic confinement system for a high temperature plasma wherein the hydromagnetic interchange stability and single-particle confinement criteria are satisfied.

Another object of the invention is to confine a high temperature plasma in an annular volume defined by a magnetic field including two annular magnetic mirror field regions.

It is a further object of the invention to provide a magnetic field having a radial component which converges to establish at least one annular magnetic mirror region.

It is still another object of the invention to magnetically confine a high temperature plasma in a region where a non-zero minimum magnetic field energy density locus exists and where the net flux line curvature about the locus is convex away from the central flux surface.

It is yet another object of the invention to provide a system for trapping and confining a high temperature plasma.

Additional objects and advantages of the invention will become apparent from the following description and claims considered together with the following drawings in which:

FIGURE 1 comprises graphical representations of partial, two dimensional projections of various surfaces of revolution defined by magnetic field lines exemplifying the theory of the present invention with portion (a) illustrative of the case where in the magnetic field is symmetrical about both the radial and axial axes, portion (b) illustrative of the case wherein the magnetic field is asymmetrical in the axial direction only and portion (c) illustrative of the case wherein the flux line curvature of the magnetic field includes a region where it is concave away from the central flux surface;

FIGURE 2 is a diagrammatic illustration of the plan view of a preferred embodiment especially adapted to operate in accordance with the present invention;

FIGURE 3 is a cross-sectional view of the embodiment of FIGURE 2 taken along line 3—3;

FIGURE 4 is a graphical illustration of the magnetic field intensity profile of the embodiment of FIGURE 2;

FIGURE 5 is a cross-sectional view of another preferred embodiment especially adapted to operate in accordance with the present invention;

FIGURE 6 is a full cross-sectional view of the embodiment of FIGURE 5 taken along line 6—6; and FIGURE 7 is a cross-sectional view of another preferred embodiment uniquely adapted to operate in accordance with the present invention.

A magnetic field in a vacuum wherein only the radial and axial magnetic field components, designated as $B_r$ and $B_z$, respectively, vary as described by Maxwell's equations:

$$\frac{1}{r}\frac{\partial(rB_r)}{\partial r}+\frac{\partial B_z}{\partial z}=0 \quad (1)$$

$$\frac{\partial B_r}{\partial z}-\frac{\partial B_z}{\partial r}=0 \quad (2)$$

where:

$r$=radial coordinate of the field
$z$=axial coordinate of the field.

Furthermore where a magnetic field is utilized for plasma confinement, the magnetic field configuration must satisfy Maxwell's equations, and, as stated before, it is desirous that it satisfy single-particle containment and hydromagnetic interchange stability criteria. Now employing radial and axial field components and wherein the net absolute field strength as seen by all particles of the plasma increases in every direction away from the plasma (hydromagnetic interchange stability criteria), in accordance with the present invention the plasma is confined to a magnetic field region including a non-zero minimum energy density locus. Thus, the equation:

$$B^2=B_r^2+B_z^2 \quad (3)$$

must have a non-zero minimum.

Referring to FIGURE 1(a), there is shown a two dimensional projection of a magnetic field 11 defined by revolving the projection about the z axis (axial axis). For finite values of $r$, the configuration of magnetic field 11, wherein the net absolute field strength increases in every direction away from the central flux surface, is described by equations:

$$B_r=\left(\frac{r_c^2}{r}+r\right)\frac{C_1}{r_c} \quad (4)$$

$$B_z=(-2z)\frac{C_1}{r_c} \quad (5)$$

where:

$r_c$=radial coordinate of the non-zero minimum energy density locus,
$C_1$=a constant in units of magnetic field intensity equal to one-half the magnetic field intensity of $r_c$.

Substituting Equations 4 and 5 into Equations 1 and 2, it is seen that the magnetic field configuration 11 illustrated in FIGURE 1(a) satisfies Maxwell's equations.

Furthermore substituting Equations 4 and 5 into Equation 3, it is seen that a non-zero minimum energy density locus does exist at the point, $r=r_c$ and $z=0$.

The total kinetic energy of a particle, W, moving in a magnetic field can be expressed by its two vectorial parts—a rotational energy, $W_\perp$, from motion perpendicular to the magnetic field lines and a translational energy, $W_\parallel$, from motion parallel to the magnetic field lines, so that at all times:

$$W=W_\perp+W_\parallel \quad (6)$$

Since the total kinetic energy, W, must be conserved on the average, as a particle contained in a magnetic field moves into a region of intensified magnetization, $W_\perp$ must increase at the expense of $W_\parallel$ ($W_\perp \alpha B$). Thus, the particles will experience a force tending to return them to the weaker magnetic field region. This force is given by the equation:

$$F_r=-\frac{W_\perp}{B}\frac{\partial B}{\partial r} \quad (7)$$

Employing the principle of conservation of energy, it can be shown that the force encountered by a particle moving in a region of intensified magnetization will be of sufficient strength to cause the particle to be returned to the weaker magnetic field region if:

$$\frac{B_m}{B_0} \geq \frac{W}{W_{\perp 0}} \quad (8)$$

where:

$B_m$=the field strength in the intensified magnetic field region, $B_0$=the field strength in the unintensified magnetic field region, $W_{\perp 0}$=the rotational energy in the region of $B_0$ magnetic field strength, and the ratio $B_m/B_0$ is designated as the magnetic mirror ratio.

Referring again to FIGURE 1(a) it is seen that the "axial convergence" of the magnetic flux lines establishes a region of intensified magnetization at the radial distance $r_2$ and hence a magnetic mirror field region 12.

Since magnetic flux is conserved, the total number of flux lines comprising magnetic field 11 is constant. Hence, the magnetic field strength is a function of the surface area through which the flux lines pass as shown in the equation:

$$B \alpha \frac{1}{A} \quad (9)$$

where: $A$=the surface area through which the flux lines pass.

In the region where the flux lines extend between a finite value of $r$ less than $r_2$ and the magnetic mirror region 12, the surface area A is described by the equation:

$$A = 2\pi r \left(1 - \frac{r}{2r_c}\right) a \quad (10)$$

where: $a$=scale factor of "$r$" and "$z$."

By confining the passage of the flux lines of magnetic field 11 to a region whose surface area through which the flux lines pass is described by Equation 10, it can be shown that the area through which the flux lines pass will have a maximum at $r=r_c$ and smaller values at larger and smaller radii, $r_2$ and $r_1$, respectively.

Thus, although the magnetic flux lines forming the magnetic mirror region 12 are seen to diverge in the axial direction (i.e., becoming more distant in the axial direction) as $r$ becomes increasingly less than $r_2$, they are in fact converging radially (i.e., coming closer together as the radius decreases) as a result of the surface area, A, variation noted supra. In terms of the radial and axial magnetic field components, $B_r$ and $B_z$, respectively, applicant has found that the contribution to the variation in the magnetic field intensity resulting from the increase in the radial component, $B_r$, of the magnetic field intensity is substantially greater than that resulting from the decrease in the axial component, $B_z$, of the magnetic field intensity.

This radial convergence of the flux lines establishes a second region of intensified magnetization (see Equation 9) at the radial distance $r_1$ and hence a second magnetic mirror field region 13. (It must be remembered that in reality mirror regions 12 and 13 are annular in configuration about the z-axis since the figure is only a two-dimensional projection of the upper half of magnetic field 11.)

Consequently, since the magnetic flux lines comprising magnetic field 11 converge to define magnetic mirror regions 12 and 13, and furthermore bend everywhere convexly away from region 14 therebetween, plasma injected and trapped in region 14 will be provided with hydromagnetic interchange stability and ideal single-particle containment.

By effecting an asymmetry along the principal axis (z-axis)—while maintaining symmetry about the principal axis—a continuous family of such plasma confinement configurations may be obtained. With reference to FIGURE 1(b) there is shown a two dimensional projection of a plasma confinement configuration in accordance with the present invention having such a slight asymmetry along z. For finite values of $r$, magnetic field 16, wherein the net absolute magnetic field strength increases in every direction away from the central flux surface, is described by equations:

$$B_r = \left(\frac{r_c^2}{r} + r\right)\frac{C_2}{r_c} + (\lambda r z)\frac{C_2}{r_c^2} \quad (11)$$

$$B_z = (-2z)\frac{C_2}{r_c} + \lambda\left(\frac{r^2}{2} - z^2\right)\frac{C_2}{r_c^2} \quad (12)$$

where:

$\lambda$=measure of asymmetry in $z$, $C_2$=a constant in units of magnetic field intensity equal to one-half the value of $B_r$ component of the magnetic field intensity at $r_c$.

Substituting Equations 11 and 12 into Equations 1 and 2, it is seen that the magnetic field configuration 16 illustrated in FIGURE 1(b) satisfies Maxwell's equations.

Furthermore substituting Equations 11 and 12 into Equation 3, it is seen that for values of $\lambda^2 \ll 1$ a non-zero minimum energy density locus does exist at $r=r_c$ and $$z = \frac{\lambda r_c}{4}$$

The magnetic flux lines of magnetic field 16 described by Equations 11 and 12 "axially converge" to establish a region of intensified magnetization at $r_2$ and hence a magnetic mirror field region 17.

The magnetic field configuration illustrated in FIGURE 1(b) differs from that illustrated in FIGURE 1(a) only in its asymmetry in $z$. This results in dissimilarities in the magnetic potential gradient and flux line curvature of the magnetic field only in the regions 18 and 19. Considering the magnetic field 16 in the region between regions 18 and 19, the flux lines pass through a surface area that is normal to the conical surface formed by revolving line $r'$ about the z-axis. The variance of this surface area is described by an equation in the form of that given by Equation 10.

Consequently, although an asymmetry exists in $z$ in the magnetic field configuration illustrated in FIGURE 1(b), the radial convergence of the magnetic flux lines establish a similar second region of intensified magnetization at $r_1$ and hence a second magnetic mirror field region 21 (again it is noted that mirror regions 17 and 21 are in fact annular in configuration about the z-axis).

As shown before the magnetic field 16 defined by Equations 11 and 12 has single-particle confinement and hydromagnetic interchange stability characteristics. Thus, it can be seen that in all magnetic field configurations established in accordance with the present invention wherein there exists a degree of asymmetry with $\lambda^2 \ll 1$, the hydromagnetic interchange stability and single-particle containment criteria are satisfied.

Referring to FIGURE 1(c) there is shown a magnetic field 22 differing from that illustrated in FIGURE 1(a) only in the region 23 wherein $\nabla B^2$ is locally unfavorable, i.e., there exists an unfavorable curvature in the magnetic flux lines. Generally, a magnetic field configuration including a large region of unfavorable flux line curvature is not considered to fulfill the conditions for satisfying hydromagnetic interchange stability criterion. However, hydromagnetic interchange stability theory serves to admit favorably that a plasma will be stably confined by a magnetic field configuration of the type shown in FIGURE 1(c) wherein $\nabla B^2$ is just locally unfavorable. The stable confinement of a plasma under such conditions results from the fact that the particles forming the plasma oscillate about minimum energy density locus 24 (at $r_c$) along the magnetic flux lines. The plasma is stable if, in so oscillating, the plasma particles encounter a net field line curvature such if the plasma is perturbed it will experience a net restoring force effecting a stabilizing influence.

Referring now to FIGURES 2, 3 and 4 there is shown a preferred embodiment for confining a high temperature plasma in accordance with the present invention comprising a generally disc shaped chamber 26. Ports 27 are disposed about the outer circumference of the chamber 26 and provide the means for attaching conventional ultra-high vacuum pump systems (not shown) thereto in order to remove extraneous atmospheres.

First, second, and third annular coils 28, 29 and 31 are disposed coaxial with and juxtaposed to one side of chamber 26, with coil 31 generally encircled by coil 29 which in turn is generally encircled by coil 28. Fourth, fifth and sixth annular coils 32, 33 and 34 are similarly disposed juxtaposed to the other side of chamber 26. Each coil 28, 29, 31, 32, 33 and 34 is provided with a pair of terminals 36 and 37, 38 and 39, 41 and 42, 43 and 44, 46 and 47, and 48 and 49 respectively. The terminals provide the means of electrically connecting the coils to a suitably energy source 51. Energy source 51 supplies current to energize the coils with current being passed through coils 28, 29 and 31 in a direction opposite to that passed through coils 32, 33 and 34.

The energized coils 28, 29 and 31, and 32, 33 and 34 establish magnetic fields 52 and 53 respectively. Magnetic fields 52 and 53 extend in flux-confluent converging magnetic flux line relation between the coils in the region within chamber 26 to establish a magnetic field 54, described by Equations 4 and 5, whose net flux line curvature is convex away from the central flux surface. The surface area through which the flux lines of magnetic field 54 pass varies radially in accordance with Equation 10 to include a region of absolute maximum at radial distance $r_c$ and regions of smaller areas at larger and smaller radial distances.

With particular reference to FIGURE 4, it is seen that the intensity of magnetic field 54 varies radially through chamber 26 to include annular regions of intensified magnetization and hence magnetic mirror regions 56 and 57 at radial distances $r_1$ and $r_2$ respectively. As previously noted in regards to FIGURE 1(a), the "axial convergence" of the magnetic flux lines of magnetic field 54 establishes one annular magnetic mirror region 57. Furthermore, by confining the passage of the flux lines of magnetic field 54 to a region within chamber 26 whose surface area through which the flux lines pass varies radially as defined by Equation 10, the radial convergence of the $B_r$ component of magnetic field 54 results in establishing the second annular magnetic mirror region 56.

The current required by each of the coils can be calculated from the field Equations 4 and 5, and Equation 10 describing the surface area variation through which the flux lines of magnetic field 54 extend and the equation:

$$J = 10 \times \left(\frac{B}{4\pi}\right) \tag{14}$$

where: $J$=current per unit length of the facing surface of the solenoid.

Referring again to FIGURE 2 particles for forming the plasma are injected by injector 58 via inlet 59 into chamber 26. The particles are trapped by the magnetic field 54 in the annular region between the annular magnetic mirrors 56 and 57.

Injection of the particles may be accomplished, for example, by employing neutral injection techniques. In such cases injector 58 will include a conventional high energy ion source and neutralizer. The neutral atoms emerging from such an injector 58 are directed in a plane parallel to the central flux surface of magnetic field 54 through inlet 59 into chamber 26. Trapping of the neutral atoms by magnetic field 54 arises from the fact that some of the injected neutral atoms are ionized by Lorentz dissociation or collisions with background particles. The ionized atoms (charged particles) are captured by magnetic field 54 and trapped (except for normal end losses through magnetic mirrors 56 and 57) between annular magnetic mirrors 56 and 57.

Outlet 61 is disposed on chamber 26 opposite inlet 59 to provide an exit for those injected neutral atoms that are not ionized by magnetic field 54. Collector 62 is disposed at outlet 61 to collect the neutral atoms entering therein.

For a given mirror ratio, in order to confine ions at a given energy, W, between mirrors 56 and 57, it is necessary to inject the atoms forming the plasma in a manner such that the energy, W, of the injected atoms is resolved into vectorial components whereby Equation 8 is satisfied. The ratio $W_\perp/W_{\shortparallel}$ of the trapped ions can be selected by choosing the point of injection of the energetic neutral atoms. For a given injected atom energy, W, from the geometry, it can be seen that the closer the injection point is to the principal axis, the greater will be the amount of this energy resolved into translational energy, $W_{\shortparallel}$.

To enhance the distribution of the trapped ions throughout the annular volume between annular magnetic mirrors 56 and 57, it is advantageous to effect an asymmetry along, while maintaining symmetry about, the principal axis in order that $\nabla B \neq 0$. Such a model is described by Equations 11 and 12.

It is readily recognizable that a chamber and coils for confining and forming respectively a magnetic field configuration as described by Equations 11 and 12 is similar to that shown in FIGURES 2 and 3. Such apparatus differs only in that when its two-dimensional projection is revolved about the principal axis, it defines a generally conical annulus.

Although the apparatus described and shown in FIGURES 2 and 3 include six separate annular coils, the three annular coils juxtaposed each side of chamber 26 can be replaced by a single coil disposed on each side of chamber 26. The two coils will have a turn distribution varying radially to establish the designated magnetic field intensity in accordance with Equations 4 and 5.

The asymmetry along the principal axis can be extended to provide a plasma confinement configuration wherein the magnetic flux lines extend to define a generally conical annular region including a cylindrical portion. The flux lines extend therethrough with a net curvature convex away from the central flux surface.

Referring to FIGURE 5, there is shown a two dimensional projection of a magnetic field 63 of the character noted supra. Magnetic field 63 is described by the equations:

$$B_r = \left(\frac{\alpha r_c}{r}\right)C_3 + \frac{z}{r_c}\left(\frac{\mu r_c}{r} - \frac{\epsilon r}{r_c}\right)C_3 \tag{15}$$

$$B_z = C_3 + \left(\mu \log \frac{r}{r_c}\right)C_3 + \frac{\epsilon}{r_c^2}\left(z^2 - \frac{r^2}{z}\right)C_3 \tag{16}$$

where: the undefined constants $\mu$, $\epsilon$, $\alpha$, and $C_3$ are to be defined hereinafter.

Substituting Equations 15 and 16 into Equations 1 and 2, it is seen that the magnetic field configuration described by Equations 15 and 16 satisfies Maxwell's equations.

Substituting Equations 15 and 16 into Equation 3 it is seen that a non-zero minimum energy density locus exists at $r = r_c$ and $z=0$ where $\epsilon > 0$ and the constants $\mu$, $\epsilon$ and $\alpha$ satisfy the relationships:

$$\epsilon = \mu - \alpha^2 \tag{17}$$

$$\mu^2 > 4\epsilon\alpha^2 \tag{18}$$

To satisfy the above noted conditions, the constant $C_3$ must equal $1/\alpha$ multiplied by the value of the $B_r$ component of the magnetic field intensity at $r_c$. The constant $\alpha$ is less than and of the order of the ratio $B_r/B_z$ at $r_c$. The constant $\epsilon$ is defined by the relationship:

$$\epsilon = 2\left(1 - \frac{\alpha B_z}{B_r}\right) \tag{19}$$

where the value of the magnetic field components is that at $r_c$. Since the constants $\epsilon$ and $\alpha$ have been defined, the value of the constant $\mu$ may be determined from Equation 18.

The flux lines of magnetic field 63 pass through a surface area that is normal to the central flux surface and which varies radially to define an area maximum in the cylindrical region 64 of magnetic field 63 and smaller areas at larger and smaller radii. The variation of this surface is described by an equation in the form of that given by Equation 10. Since magnetic flux of magnetic field 63 is conserved, annular regions of intensified magnetization are established at the area minimums and hence magnetic mirrors 66 and 67 respectively. Magnetic mirror 66 is established by the "axial convergence" of the flux lines of magnetic field 63. Magnetic mirror 67 is established by the radial convergence of the flux lines of magnetic field 63.

Referring now to both FIGURES 5 and 6, there is shown another preferred embodiment for confining a high temperature plasma in accordance with the present invention comprising a generally truncated conical annular chamber 68 including a cylindrical portion 69. Ports 71 are disposed about the skirt 72 and at the truncated end 73 of chamber 68 and provide the means for attaching conventional ultra-high vacuum pump systems (not shown) thereto in order to remove extraneous atmospheres therefrom.

A first cylindrical annular coil 74 is disposed coaxial with and juxtaposed to the outside circumference of the cylindrical annular portion 69 of chamber 68. On each side of coil 74 is disposed a truncated conical annular coil 76 and 77 respectively coaxial with and juxtaposed to the outside circumference of chamber 68.

Second and third cylindrical annular coils 78 and 79 are coextensive, and are disposed coaxial with and juxtaposed to the inside circumference of the cylindrical annular portion 69 of chamber 68.

A third truncated conical annular coil 81 is disposed coaxial with and juxtaposed with the inside circumference of the section of chamber 68 that extends to its skirt 71.

Each of the coils 74, 76, 77, 78, 79 and 81 is provided with respective pairs of terminals 82 and 83, 84 and 86, 87 and 88, 89 and 91, 92 and 93, and 94 and 96. Those terminals provide the means of electrically connecting the coils to a suitable energy source 97. Energy source 97 supplies current to energize the coils with current being passed through coils 74, 76 and 77 in a direction opposite to that passed through coils 78, 79 and 81.

The energized coils 74, 76 and 77, and 78, 79, and 81 establish magnetic fields 98 and 99 respectively. Magnetic fields 98 and 99 extend in flux-confluent converging magnetic flux line relation between the coils in the region within chamber 68 to establish a magnetic field 63 described by Equations 15 and 16.

In the region between magnetic mirrors 66 and 67, the flux lines pass through a surface area that is normal to the central flux surface which is in the form of Equation 10. As previously noted, this area includes a region of absolute maximum at the radial distance of the central flux surface in the generally cylindrical magnetic field region and regions of smaller areas at larger and smaller radial distances in the conical regions of magnetic field 63. The current required by each of the coils can be calculated from Equations 14, 15, 16 and the equation describing the particular radial area variation.

Although as can be seen in FIGURE 5 the magnetic field 64 of the present embodiment includes regions 101 and 102 wherein the magnetic field lines are unstably oppositely curved respectively, magnetic field 63 provides hydromagnetically stable plasma confinement. The stability originates from the fact that the magnetic field lines have an inflection point at the minimum energy density, $B^2$, locus. Since the plasma particles oscillate about the minimum energy density locus, the particles contained by magnetic field configurations of the character described by Equations 15 and 16 encounter a stable net field line curvature.

Magnetic field configurations described by Equations 15 and 16 have a distinct advantage associated therewith besides those associated with the axially-radially symmetric and the asymmetric-along-the-principal-axis configurations. With reference to FIGURE 5 it is noted that the axial and radial convergence of magnetic field 63 occurs substantially only in regions 102 and 101 respectively. Furthermore, to curve the flux lines of magnetic field 63 as shown, considerable more power is required by coils 76, 77, 78 and 81 causing such curvature than by coils 74 and 79 establishing the cylindrical region 64 of magnetic field 63. Hence, if the size of the plasma confinement region is increased, e.g., by extending cylindrical region 64 of magnetic field 63, the power requirement of coils 76, 77, 78 and 81 is substantially unchanged. The only additional power required is that by the extensions of coils 74 and 79. However, if the plasma confinement region of, for example, the embodiment shown in FIGURES 2 and 3 is increased, all of the coils producing magnetic field 24 would have to be increased in size and the power requirement of each also increased. Thus, for large plasma confinement machines, the embodiment illustrated in FIGURES 5 and 6 would ordinarily be more economical than that illustrated in FIGURES 2 and 3.

With particular reference to FIGURE 6, atoms for forming the plasma are injected by an injector 103 via an inlet 104 extending through coil 74 into chamber 68. The atoms are trapped by magnetic field 63 in the annular region between the annular magnetic mirrors 66 and 67. Such injection may be accomplished by neutral injection techniques in the manner noted in reference to the previously described embodiment of the invention illustrated in FIGURES 2 and 3.

When neutral injection techniques are utilized, an outlet 106, extending through coil 74, is disposed on chamber 68 opposite inlet 104 to provide an exit for those injected neutral atoms that are not ionized by magnetic field 63. A collector 107 is disposed at outlet 106 to collect the neutral atoms entering therein.

Although the apparatus described and shown in FIGURES 5 and 6 include six separate coils, the three coils 74, 76 and 77 juxtapose the outside circumference and the three coils 78, 79 and 81 juxtapose the inside circumference of chamber 68 can be replaced respectively by a single coil. The two coils will have a turn distribution per unit length to establish the designated magnetic field intensity in accordance with Equations 3, 15 and 16.

Referring now to FIGURE 7 there is shown a cross sectional view of another preferred embodiment for confining a high temperature plasma in accordance with the present invention having economic advantages with respect to size-power requirements exceeding those of the embodiments described previously. The confining magnetic field established by the present embodiment is described by the same Equations 15 and 16, that described the embodiment illustrated in FIGURES 5 and 6.

The embodiment illustrated in FIGURE 7 comprises a chamber 108 substantially of the same configuration of chamber 68 illustrated in FIGURE 5. Ports 109 are affixed to chamber 108, e.g., at the skirt end, and provide the means for attaching ultra-high vacuum pump systems thereto in order to remove extraneous atmospheres therefrom.

A coil 111 is disposed coaxial with and juxtapose the outside circumference of the chamber 108.

A truncated conical annular coil 112 is similarly oriented and disposed coaxial with and juxtaposed with the inside circumference of the truncated section of chamber 108 that extends to its skirt 113.

A coil 114 having a truncated conical annular portion surmounted by a cylindrical annular portion at its truncated end is disposed coaxial with and juxtaposed with the outside circumference of a cylindrical finger 116 which extends inwardly from the truncated end of chamber 108. The orientation of coil 114 is similar to that of chamber 108.

Each coil 111, 112 and 114 is provided with a pair of terminals 117 and 118, 119 and 121, and 122 and 123 respectively. The terminals provide means of electrically connecting the coils to a suitable energy source 124. Energy source 124 supplies current to energize the coils with current being passed through coil 112 in a direction opposite to that passed through coils 111 and 114.

The energized coil 111 establishes a toroidal magnetic field 126. The energized coil 112 establishes a second toroidal magnetic field 127. Magnetic fields 126 and 127 extend in flux-confluent converging magnetic flux line relation in the region defined by the proximal portion of coils 111 and 112.

The energized coil 114 establishes a third torodial magnetic field 128. Magnetic fields 126 and 128 extend in opposing magnetic flux line relation in the region defined by the proximal portion of coils 111 and 114.

The effect of magnetic field 127 on the magnetic field 126 is to cause a "intertoroidal tangency convergence" of their respective flux lines and hence the establishment of an annular magnetic mirror region 129.

The effect of magnetic field 128 on the magnetic field 126 is to cause the net flux line curvature of magnetic field 126 to be stably curved.

The flux lines of magnetic field 126 pass through a surface area that is normal to the central flux surface which varies radially to include a region of absolute maximum in the magnetic field region proximal to the cylindrical portion 131 of coil 111, and regions of smaller areas at larger and smaller radii. The variance of this surface area is described by an equation in the form of that given by Equation 10.

By confining magnetic field 126 to region wherein its flux lines pass through an area normal to the central flux surface which varies as noted supra, the radial convergence of the magnetic flux lines establish a second annular magnetic mirror region 132 at the truncated end of chamber 108.

The injection and trapping of particles to form the plasma is accomplished in the identical manner as shown and described in connection with the embodiment illustrated in FIGURES 5 and 6. For advantageous operation such injection would be made at inlet 133 disposed at $z=0$ and $r=r_c$.

As can be seen from the above noted description of the embodiment of the present invention illustrated in FIGURE 7, a substantial portion of magnetic field 126 is established solely by the cylindrical portion 131 of energized coil 111. Thus, for various sizes of plasma confinement regions, the only additional power that would be required would be that needed in lengthening the cylindrical portion 131 of coil 111. Hence, for large sizes of plasma confinement regions, the embodiment illustrated in FIGURE 7 not only represents a savings in power requirement over the embodiments of the class illustrated in FIGURES 2 and 3, but also the embodiment illustrated in FIGURES 5 and 6. The reason for the economic advantage of the embodiment illustrated in FIGURE 7 over that illustrated in FIGURES 5 and 6 is the requirement of the coaxially disposed long cylindrical coil.

A particular example of parameters for establishing a magnetic field configuration in accordance with the present invention will be given with respect to FIGURE 7. The cylindrical portion 131 of coil 111 is 10 meters in length and 10 centimeters thick with a mean radius of 60 centimeters. The cylindrical portion of coil 114 has a mean radius of 15 centimeters with a thickness of 5 centimeters. The truncated annular portion of coil 111 at its truncated end has a mean radius of 30 centimeters with a thickness of 10 centimeters. The truncated annular portion of coil 111 at its skirt end has a mean radius of 90 centimeters with a thickness of 10 centimeters.

For a magnetic mirror ratio $(B_m/B_0)$ equal to two wherein the magnetic field intensity $B_0$ in the cylindrical portion 131 of coil 111 equals 10 kilogauss and hence a magnetic field intensity $B_m$ at the magnetic mirrors 129 and 133 equals 20 kilogauss, the following current conditions must be satisfied. The current density in the cylindrical portion 131 of coil 111 must be 800 amps/cm.$^2$. The current density at the truncated end of coil 111 must be 3200 amps/cm.$^2$. The current density at the skirt end of coil 111 must be 800 amps/cm.$^2$. The current density at the skirt end of truncated conical annular coil 112 must be 800 amps/cm.$^2$. The current density in the cylindrical portion of coil 114 must be 6400 amps/cm.$^2$.

While the present invention has been described with reference to particular embodiments, it must be remembered that the primary novelty resides in the establishment of a non-zero annular magnetic field region having at least one mirror in which the radial convergence of the magnetic flux lines is caused to be greater than the principal axis divergence by a predetermined current density distribution.

Various additional embodiments and applications of the hereinbefore disclosed apparatus and systems will become apparent to those skilled in the art. It is therefore to be understood that all matters contained in the above description are illustrative only and do not limit the scope of the present invention.

What is claimed is:

1. In apparatus for magnetically confining a plasma, the combination comprising:
   (a) means including a first annular solenoidal coil arranged for energization by electrical current flowing in a first direction; and
   (b) means including a second annular solenoidal coil arranged in spaced coaxial relation with said first coil to define an annular space therebetween and arranged for energization by electrical current flowing in a counter rotating direction with respect to the current in said first coil, said solenoidal coils having a current density distribution proportioned to provide a magnetic field having first and second annular intensified magnetic field regions serving as magnetic mirrors for charged particles, said regions disposed in the space between said solenoids at different first and second respective annular radii about the axis of said solenoidal coils and an annular zone having a magnetic field intensity less than that of said intensified field regions, but greater than zero, situated therebetween, thereby defining an annular zone for the stable confinement of a plasma therein.

2. The apparatus for magnetically confining a plasma of claim 1 wherein the current density distribution in said annular coils establishes a magnetic field having a radial component $B_r$ and an axial component $B_z$ defined by the following equations:

$$B_r = \left(\frac{r_0^2}{r} + r\right)\frac{C_1}{r_0}$$

$$B_z = (-2z)\frac{C_1}{r_0}$$

where:
   $r$ = radial coordinate of said resultant magnetic field region,
   $z$ = principal axis coordinate of said resultant field region, $r_c$ = radial coordinate of the non-zero minimum energy density locus, $C_1$ = a constant in units of magnetic field intensity equal to one-half the magnetic field intensity at $r_c$.

3. The apparatus for magnetically confining a plasma of claim 1 wherein said current density distribution in said solenoidal coils establishes a magnetic field having a radial component $B_r$ and an axial component $B_z$ defined by the following equations:

$$B_r = \left(\frac{r_c^2}{r} + r\right)\frac{C_2}{r_c} + (\lambda r z)\frac{C_2}{r_c^2}$$

$$B_z = (-2z)\frac{C_2}{r_c} + \lambda\left(\frac{r^2}{2} - z^2\right)\frac{C_2}{r_c^2}$$

where:
- $r$ = radial coordinate of said resultant magnetic field region,
- $z$ = principal axis coordinate of said resultant field region,
- $r_c$ = radial coordinate of the non-zero minimum energy density locus,
- $\lambda$ = measure of asymmetry in $z$ with $\lambda^2 \ll 1$,
- $C_2$ = a constant in units of magnetic field intensity equal to one-half the value of $B_r$ component of the magnetic field intensity at $r_c$.

4. Apparatus for magnetically confining a plasma according to claim 1 wherein the current density distribution in said solenoidal coils establishes a magnetic field having a radial component $B_r$ and an axial component $B_z$ defined by the following equations:

$$B_r = \frac{\alpha r_c}{r}C_3 + \frac{z}{r_c}\frac{\mu r_c}{r} - \frac{\epsilon r}{r_c}C_3$$

$$B_z = C_3 + \mu \log \frac{r}{r_c} C_3 + \frac{\epsilon}{r_c^2}z^2 - \frac{r^2}{2}C_3$$

where:
- $r$ = radial coordinate of said resultant magnetic field region,
- $z$ = principal axis coordinate of said resultant field region,
- $r_c$ = radial coordinate of the non-zero minimum energy density locus,
- $\epsilon = 2\left(1 - \frac{\alpha B_z}{B_r}\right) > 0$
- $\epsilon = \mu - \alpha^2 > 0$
- $\mu^2 4\epsilon\alpha^2$
- $C_3 = 1/\alpha$ multiplied by the value of $B_r$ component of the magnetic field intensity at $r_c$,
- $\alpha$ and of the order of the ratio $B_r/B_z$ at $r_c$.

References Cited

UNITED STATES PATENTS

| | | | |
|---|---|---|---|
| 3,093,765 | 6/1953 | Prevot | 315—111 |
| 3,163,798 | 12/1964 | Salz | 315—111 |
| 3,230,418 | 1/1966 | Dandl | 313—231 |

JAMES W. LAWRENCE, *Primary Examiner.*

STANLEY D. SCHLOSSER, *Examiner.*

R. L. JUDD, *Assistant Examiner.*